US012046731B2

(12) United States Patent
Jung et al.

(10) Patent No.: US 12,046,731 B2
(45) Date of Patent: Jul. 23, 2024

(54) BATTERY MODULE, METHOD FOR PREPARING THE SAME AND BATTERY PACK INCLUDING THE SAME

(71) Applicant: LG Chem, Ltd., Seoul (KR)

(72) Inventors: Kitaek Jung, Daejeon (KR); Junyeob Seong, Daejeon (KR); Jee Hoon Jeong, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 641 days.

(21) Appl. No.: 17/280,400

(22) PCT Filed: May 11, 2020

(86) PCT No.: PCT/KR2020/006148
§ 371 (c)(1),
(2) Date: Mar. 26, 2021

(87) PCT Pub. No.: WO2020/251171
PCT Pub. Date: Dec. 17, 2020

(65) Prior Publication Data
US 2021/0384566 A1 Dec. 9, 2021

(30) Foreign Application Priority Data
Jun. 12, 2019 (KR) .................. 10-2019-0069463

(51) Int. Cl.
*H01M 10/653* (2014.01)
*H01M 10/04* (2006.01)
(Continued)

(52) U.S. Cl.
CPC ......... *H01M 10/653* (2015.04); *H01M 10/04* (2013.01); *H01M 50/209* (2021.01); *H01M 50/505* (2021.01)

(58) Field of Classification Search
None
See application file for complete search history.

(56) References Cited

U.S. PATENT DOCUMENTS 4,002,497 A 1/1977 Brown
9,786,875 B2 * 10/2017 Juventin ............. H01M 10/643
(Continued)

FOREIGN PATENT DOCUMENTS

CN 102414909 A 4/2012
CN 105762310 A 7/2016
(Continued)

OTHER PUBLICATIONS

Search Report dated May 8, 2023 from the Office Action for Chinese Application No. 202080005613.8 issued May 10, 2023, pp. 1-3. [see pp. 1-2, categorizing the cited references].
(Continued)

*Primary Examiner* — Scott J. Chmielecki
(74) *Attorney, Agent, or Firm* — Lerner David LLP

(57) ABSTRACT

A battery module according to one embodiment of the present disclosure includes: a cell stack including one or more battery cells; a mono frame accommodating the cell stack therein; and a thermally conductive resin layer positioned between a lower portion of the cell stack and the mono frame. The battery module further includes a spring positioned between an upper portion of the cell stack and the mono frame.

12 Claims, 4 Drawing Sheets

(51) Int. Cl.
*H01M 50/209* (2021.01)
*H01M 50/505* (2021.01)

(56) References Cited

U.S. PATENT DOCUMENTS

| | | | |
|---|---|---|---|
| 9,929,384 | B2 | 3/2018 | Le-Gall et al. |
| 10,153,526 | B2 | 12/2018 | Motohashi et al. |
| 2011/0151305 | A1 | 6/2011 | Bolze et al. |
| 2011/0262799 | A1 | 10/2011 | Kim |
| 2012/0183832 | A1* | 7/2012 | Culver ............... H01M 50/529 429/120 |
| 2014/0087231 | A1 | 3/2014 | Schaefer et al. |
| 2015/0171385 | A1* | 6/2015 | Juventin ............ H01M 10/653 429/99 |
| 2016/0049703 | A1* | 2/2016 | Lobert ............... H01M 10/486 429/62 |
| 2017/0069888 | A1 | 3/2017 | Uchida et al. |
| 2018/0309101 | A1 | 10/2018 | Nakai et al. |
| 2018/0358660 | A1* | 12/2018 | Fan ...................... H01R 4/4811 |
| 2019/0001838 | A1 | 1/2019 | Choi et al. |
| 2019/0131678 | A1* | 5/2019 | Kim ................... H01M 10/656 |
| 2019/0280325 | A1* | 9/2019 | Jung ................. H01M 10/0481 |

FOREIGN PATENT DOCUMENTS

| | | | |
|---|---|---|---|
| CN | 109155449 A | 1/2019 | |
| CN | 109428020 A | 3/2019 | |
| DE | 102011103965 A1 | 12/2012 | |
| EP | 3444889 A1 | 2/2019 | |
| EP | 3451407 A1 | 3/2019 | |
| JP | 2000229343 A | 8/2000 | |
| JP | 2009146929 A | 7/2009 | |
| JP | 2012009499 A | 1/2012 | |
| JP | 2013051100 A | 3/2013 | |
| JP | 6130916 B2 | 5/2017 | |
| JP | 6282731 B2 | 2/2018 | |
| JP | 2018147837 A | 9/2018 | |
| JP | 2019511810 A | 4/2019 | |
| JP | 2019515461 A | 6/2019 | |
| KR | 20110117585 A | 10/2011 | |
| KR | 20150005684 A | 1/2015 | |
| KR | 20150005982 A | 1/2015 | |
| KR | 20160133245 A | 11/2016 | |
| KR | 10-2017-0008279 * | 1/2017 | .......... H01M 10/656 |
| KR | 20180084540 A | 7/2018 | |
| WO | 2009103464 A1 | 8/2009 | |
| WO | 2010012343 A1 | 2/2010 | |
| WO | 2017068708 A1 | 4/2017 | |
| WO | 2018206896 A1 | 11/2018 | |

OTHER PUBLICATIONS

Extended European Search Report including Written Opinion for Application No. 20823153.0 dated Nov. 16, 2021, pp. 1-8.

International Search Report for Application No. PCT/KR2020/006148, Dated Aug. 27, 2020, 3 pages.

Search Report dated Aug. 20, 2022 from the Office Action for Chinese Application No. 202080005613.8 issued Aug. 26, 2022, pp. 1-3.

* cited by examiner

[FIG. 1]
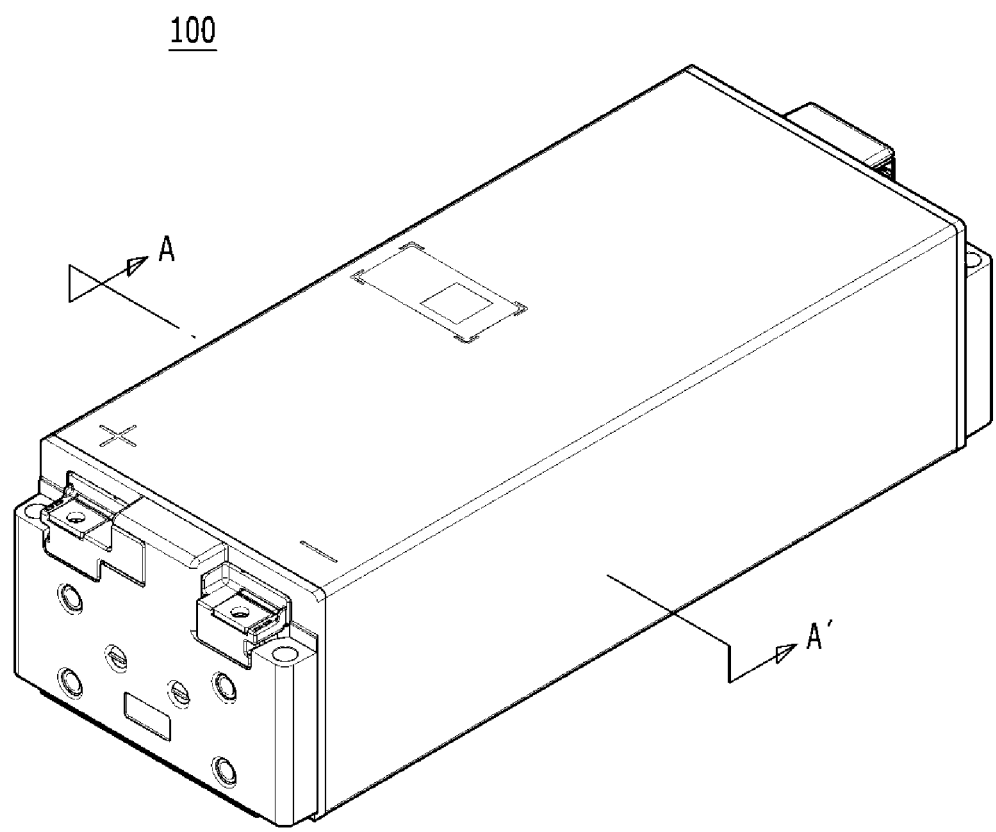

[FIG. 2]
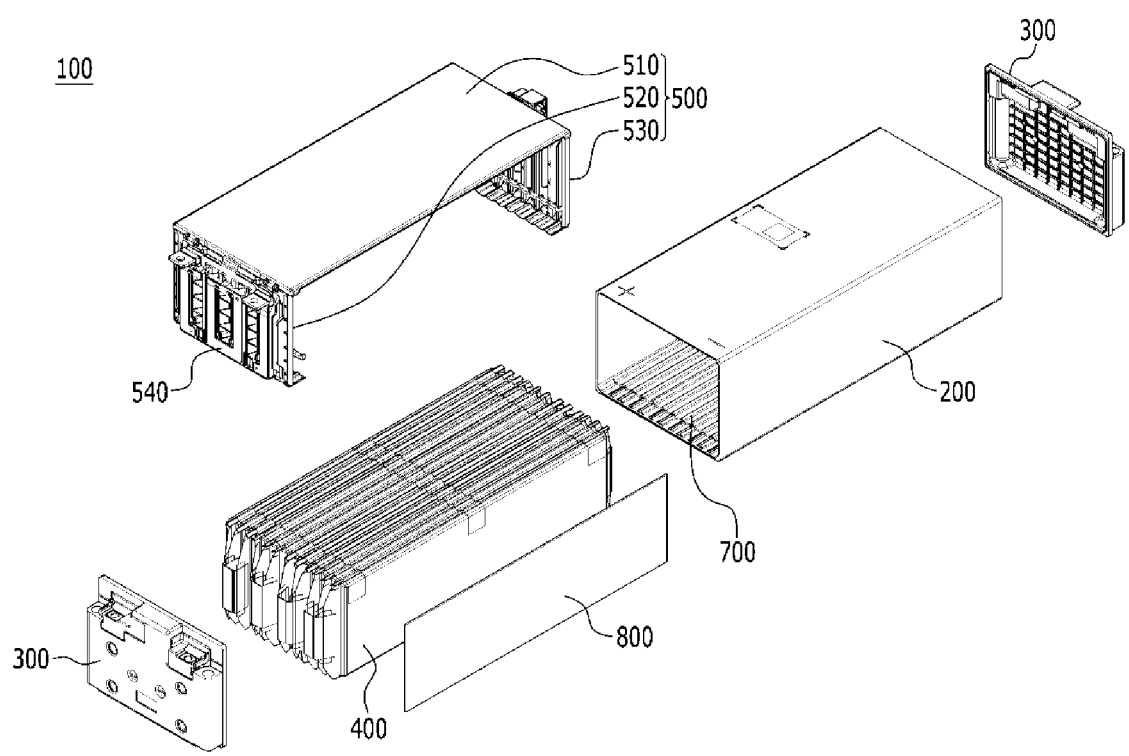

[FIG. 3]
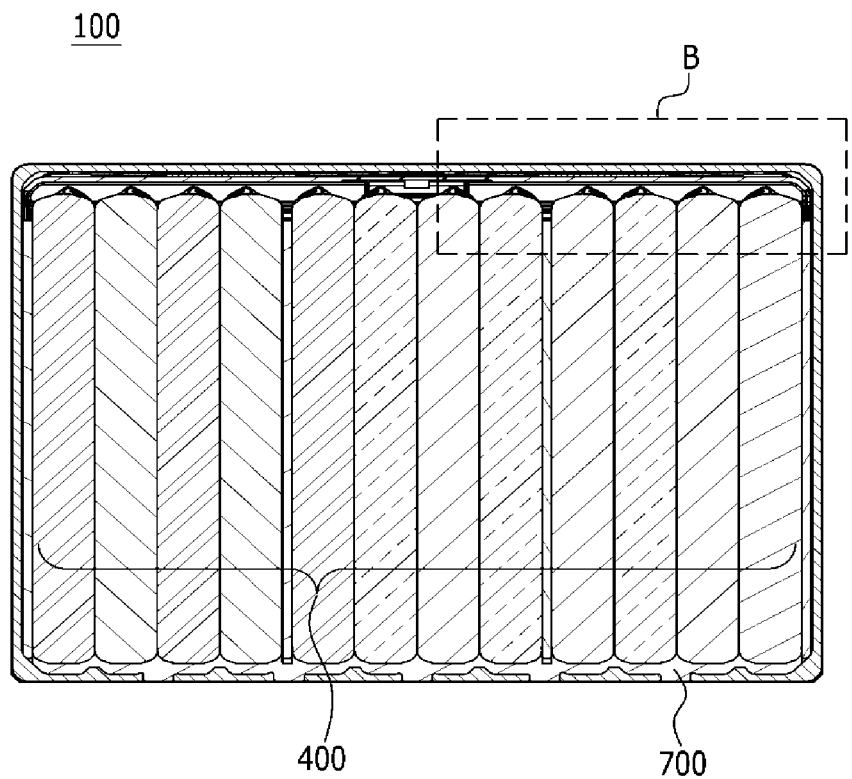
[FIG. 4]
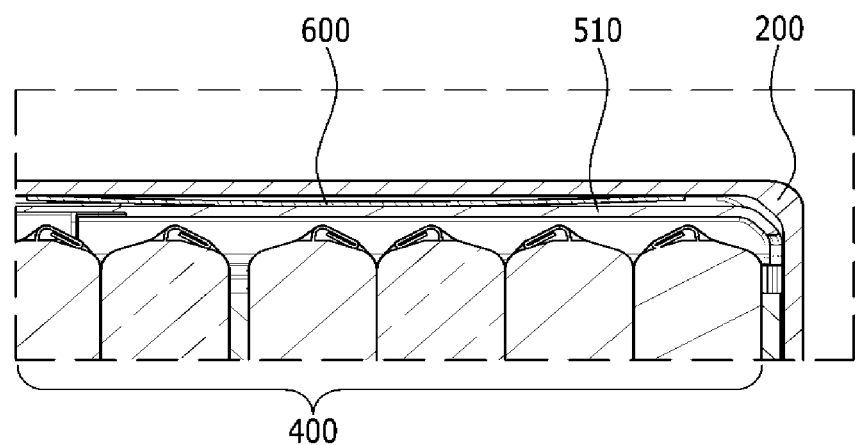

[FIG. 5]
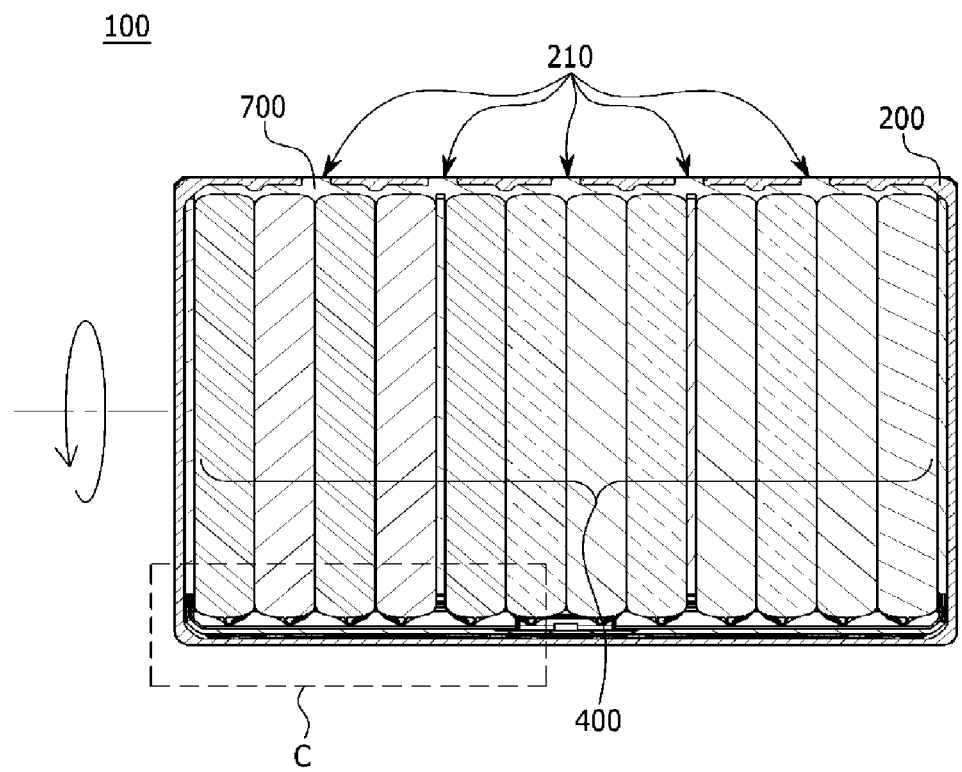
[FIG. 6]
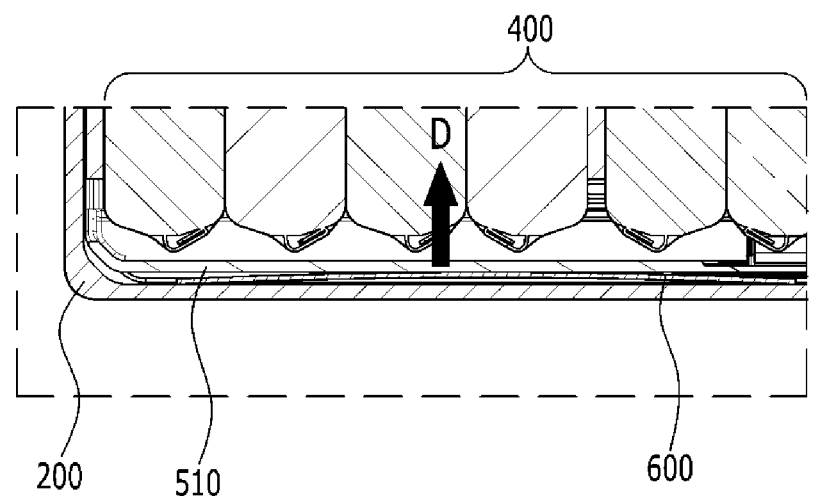

BATTERY MODULE, METHOD FOR PREPARING THE SAME AND BATTERY PACK INCLUDING THE SAME

CROSS-REFERENCE TO RELATED APPLICATIONS

This application is a national phase entry under 35 U.S.C. § 371 of International Application No. PCT/KR2020/006148 filed on May 11, 2020, which claims priority from Korean Patent Application No. 10-2019-0069463 filed on Jun. 12, 2019, the disclosure of which is incorporated herein by reference in its entirety.

TECHNICAL FIELD

The present disclosure relates to a battery module, a method of preparing the same, and a battery pack including the battery module, and more particularly, to a battery module capable of adjusting the injection amount of a thermally conductive resin, a method for preparing the same, and a battery pack including the battery module.

BACKGROUND ART

In modern society, as portable devices such as mobile phones, notebook computers, camcorders and digital cameras have been daily used, the development of technologies in the fields related to mobile devices as described above has been activated. In addition, rechargeable secondary batteries are used as a power source for electric vehicles (EV), hybrid electric vehicles (HEV), plug-in hybrid electric vehicles (P-HEV) and the like, in an attempt to solve air pollution and the like caused by existing gasoline vehicles using fossil fuel, and therefore, there is an increasing need for development of the secondary battery.

Currently commercialized secondary batteries include nickel cadmium batteries, nickel hydrogen batteries, nickel zinc batteries, and lithium secondary batteries. Among them, lithium secondary batteries have come into the spotlight because they have advantages, for example, hardly exhibiting memory effects compared to nickel-based secondary batteries and thus being freely charged and discharged, and having very low self-discharge rate and high energy density.

Such lithium secondary batteries mainly use a lithium-based oxide and a carbonaceous material as a positive electrode active material and a negative electrode active material, respectively. A lithium secondary battery includes an electrode assembly in which a positive electrode plate and a negative electrode plate respectively coated with the positive electrode active material and the negative electrode active material are disposed with a separator being interposed between them, and an exterior material, i.e., battery case, which seals and accommodates the electrode assembly together with an electrolyte.

Generally, lithium secondary batteries may be classified into a can-type secondary battery in which the electrode assembly is embedded in a metal can, and a pouch-type secondary battery in which the electrode assembly is embedded in a pouch of an aluminum laminate sheet, depending on the shape of the exterior material.

In the case of a secondary battery used for a small-sized device, two to three battery cells are arranged, but in the case of a secondary battery used for a medium- to large-sized device such as an automobile, a battery pack in which a large number of battery cells are electrically connected is used. This battery pack usually includes a plurality of secondary batteries, and the plurality of secondary batteries are connected to each other in series and in parallel to enhance the capacity and output. Further, the one or more battery modules may be mounted together with various control and protection systems such as a battery management system (BMS), a cooling system, and the like to form a battery pack.

On the other hand, in order to protect the cell stack from external shock, heat or vibration, the battery module may include a mono frame having opened front and rear surfaces to accommodate the cell stack in the internal space, and an end plate covering the front and rear surfaces of the mono frame.

In this case, a thermally conductive resin may be injected between the cell stack and the mono frame to form a thermally conductive resin layer, which may serve to transfer heat generated from the cell stack to a bottom of the battery module.

However, in the process of injecting the thermally conductive resin, due to the tolerance of parts in the battery module, etc., it is possible to inject more than the predetermined amount, which causes the problem that the preparation cost of the battery module increases, thereby adversely affecting profitability.

DETAILED DESCRIPTION OF THE INVENTION

Technical Problem

Embodiments of the present disclosure have been proposed to solve the above problems, and an object thereof is to provide a battery module capable of injecting a predetermined amount of a thermally conductive resin, and a method for preparing the battery module.

However, the problem to be solved by the embodiments of the present disclosure is not limited to the above-described problems, and can be variously expanded within the scope of the technical idea included in the present disclosure.

Technical Solution

A battery module according to one embodiment of the present disclosure comprises: a cell stack including one or more battery cells; a mono frame accommodating the cell stack; and a thermally conductive resin layer positioned between a lower portion of the cell stack and the mono frame, wherein the battery module further comprises a spring positioned between an upper portion of the cell stack and the mono frame.

The spring may push the cell stack downward.

The battery module may further comprise a busbar frame accommodated in the mono frame together with the cell stack, wherein the busbar frame may include an upper frame positioned at the upper portion of the cell stack, and the spring may be positioned between the upper frame and the mono frame.

The spring may include at least one of a plate spring and a cylindrical spring.

The spring may comprise two or more springs.

The thermally conductive resin layer may include a thermally conductive adhesive material.

The mono frame may have a shape in which front and rear surfaces are opened.

A method of preparing a battery module according to one embodiment of the present disclosure comprises: an accommodating step of accommodating a cell stack including one or more battery cells in a mono frame; and an injecting step of injecting a thermally conductive resin through an injection hole formed at a lower portion of the mono frame, wherein the injecting step includes a step in which a spring positioned between an upper portion of the cell stack and the mono frame pushes the cell stack in a direction opposite to the injection direction of the thermally conductive resin.

The injecting step may include a step of inverting the mono frame so that the injection hole faces upward and injecting the thermally conductive resin.

The spring may include at least one of a plate spring and a cylindrical spring.

Advantageous Effects

According to the embodiments of the present disclosure, since an internal space of the battery module can be reduced through a spring disposed inside the mono frame to inject a predetermined amount of a thermally conductive resin, the preparation cost of the battery module is reduced.

BRIEF DESCRIPTION OF THE DRAWINGS

FIG. 1 is a perspective view of a battery module according to one embodiment of the present disclosure.

FIG. 2 is an exploded perspective view of the battery module of FIG. 1.

FIG. 3 is a cross-sectional view of the battery module of FIG. 1 taken along a cutting line A-A'.

FIG. 4 is an enlarged view of a portion "B" of FIG. 3.

FIG. 5 is a cross-sectional view illustrating a method of preparing a battery module according to one embodiment of the present disclosure.

FIG. 6 is an enlarged view of a portion "C" of FIG. 5.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

FIG. 1 is a schematic perspective view of a battery module 100 according to one embodiment of the present disclosure, and FIG. 2 is an exploded perspective view of the battery module 100 of FIG. 1.

Referring to FIGS. 1 and 2, the battery module 100 according to one embodiment of the present disclosure includes a cell stack 400 including one or more battery cells, a mono frame 200 accommodating the cell stack 400, and a thermally conductive resin layer 700 positioned between a lower portion of the cell stack 400 and the mono frame 200.

The mono frame 200 has a shape in which front and rear surfaces are opened, and may have an end plate 300 covering the front and rear surfaces.

Further, a busbar frame 500 accommodated in the mono frame 200 together with the cell stack 400 may be provided. The busbar frame 500 may include an upper frame 510 located at an upper portion of the cell stack 400, a front frame 520 located at a front surface of the cell stack 400, and a rear frame 530 located at a rear surface of the cell stack 400, wherein a busbar 540 connected to electrode leads of battery cells constituting the cell stack 400 may be mounted on the front frame 520 and the rear frame 530.

The thermally conductive resin layer 700 is formed by injecting a thermally conductive resin, and may include a thermally conductive adhesive material. Specifically, a thermally conductive resin having fluidity is injected, and then the thermally conductive resin can be solidified and formed while being in contact with the cell stack 400. That is, it is possible to perform both the role of transferring heat generated from the cell stack 400 to a bottom of the battery module 100 and the role of fixing the cell stack 400 in the battery module 100.

Meanwhile, a heat sink 800 may be provided on a side surface of the cell stack 400 and be accommodated together in the mono frame 200.

FIG. 3 is a cross-sectional view of the battery module of FIG. 1 taken along a cutting line A-A', and FIG. 4 is an enlarged view of a portion "B" of FIG. 3.

Referring to FIGS. 3 and 4, the battery module of the present embodiment further includes a spring 600 positioned between an upper portion of the cell stack 400 and the mono frame 200. More particularly, the spring 600 may be positioned between an upper frame 510 of the busbar frame positioned at an upper portion of the cell stack 400 and the mono frame 200.

The spring 600 may push the upper frame 510 and the cell stack 400 downward while being positioned between the upper frame 510 and the mono frame 200. As a result, a space between the lower portion of the cell stack 400 and the mono frame 200 is reduced, and it is possible to prevent the thermally conductive resin, which is injected to form the thermally conductive resin layer 700, from being injected in an excessive amount more than necessary. Finally, since a predetermined amount of the thermally conductive resin can be injected, it is effective in reducing the preparation cost. This will be described in detail again with reference to FIGS. 5 and 6.

In addition, in order that the elastic force of the spring 600 applied to the cell stack 400 is not concentrated in any one portion and acts evenly, preferably two or more springs 600 are provided. More preferably, two or more springs 600 are evenly distributed over all areas of the upper surface of the upper frame 510.

If two or more springs 600 are evenly distributed over all areas of the upper surface of the upper frame 510 as described above, while the thermally conductive resin is injected, the elastic force by the spring 600 may act evenly without being biased to any one portion of the cell stack 400. By a balance between the elastic force acting evenly to the cell stack 400 and the injection pressure of the thermally conductive resin, the thermally conductive resin can be uniformly applied on the entire lower portion of the cell stack 400, and the thermally conductive resin layer 700 can be formed in a constant thickness. Therefore, since the heat generated from the battery cells constituting the cell stack 400 can be constantly transferred over the entire area, it exhibits the effect of reducing a temperature deviation between the battery cells constituting the cell stack 400, in addition to the heat dissipation effect.

Meanwhile, if the spring 600 can push the cell stack 400 downward, its shape is not limited. Thus, it may be a plate spring as shown in FIG. 4, or a cylindrical spring (not shown), or a combination of the plate spring and the cylindrical spring. However, since it is not preferable that the spring occupies more space than necessary in the battery module, the plate spring is preferable.

FIG. 5 is a cross-sectional view illustrating a method of preparing a battery module 100 according to one embodiment of the present disclosure, and FIG. 6 is an enlarged view of a portion "C" of FIG. 5.

Hereinafter, a method of preparing the battery module 100 according to one embodiment of the present disclosure will be described. However, descriptions of the parts overlapping with the above-described contents will be omitted.

Referring to FIGS. 5 and 6, the method of preparing the battery module 100 according to the present embodiment includes an accommodating step of accommodating a cell stack 400 including one or more battery cells in a mono frame 200, and an injecting step of injecting a thermally conductive resin through an injection hole 210 formed at a lower portion of the mono frame 200 to form a thermally conductive resin layer 700.

First, the mono frame 200 may have a shape in which front and rear surfaces are opened, and the accommodating step may include a step of inserting the cell stack 400 into the front or rear surface of the open mono frame 200.

Next, in the injecting step, the mono frame 200 may be inverted so that the injection hole 210 faces upward, and the thermally conductive resin may be injected through the injection hole 210. In this case, the spring 600 located between the upper portion of the cell stack 400 (based on the orientation before the mono frame was inverted) and the mono frame 200 can push the cell stack in a direction opposite to the injection direction of the thermally conductive resin (D direction).

When injecting the thermally conductive resin while the mono frame 200 is inverted so that the injection hole 210 faces upward, the cell stack 400 is brought into close contact with the bottom (based on the orientation after the mono frame is inverted) due to the weight of the cell stack 400, and therefore a space in which the thermally conductive resin will be injected is increased, which may cause a problem that the thermally conductive resin is injected in an excessive amount more than necessary.

When the thermally conductive resin is injected through the injection hole 210, the spring 600 of the present embodiment can push the cell stack 400 in a direction opposite to the injection direction of the thermally conductive resin (D direction) by its elastic force. Therefore, it is possible to solve the problem that the thermally conductive resin is injected in an excessive amount.

The fact that the spring 600 can include at least one of a plate spring or a cylindrical spring and the fact that it can include two or more will be omitted because that overlaps with the content described above.

The one or more battery modules according to the above-mentioned embodiment may be mounted together with various control and protection systems such as battery management system (BMS) and a cooling system to form a battery pack.

The battery module or the battery pack may be applied to various devices. In detail, the battery module or the battery pack may be applied to transportation means such as an electric bike, an electric vehicle, and a hybrid electric vehicle, and may be applied to various devices using a secondary battery, without being limited thereto.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

DESCRIPTION OF REFERENCE NUMERALS

100: battery module
200: mono frame
210: injection hole
300: end plate
400: cell stack
500: busbar frame
600: spring
700: thermally conductive resin layer

The invention claimed is:

1. A method of preparing a battery module comprising:
accommodating a cell stack in a mono frame, the cell stack including one or more battery cells stacked in a stacking direction; and
injecting a thermally conductive resin in an injection direction through an injection hole formed along a first portion of the mono frame,
wherein, during the step of injecting the thermally conductive resin, a spring positioned between the cell stack and a second portion of the mono frame pushes the cell stack in a biasing direction opposite to the injection direction of the thermally conductive resin, the second portion of the mono frame being positioned on an opposite side of the cell stack from the first portion of the mono frame, and the biasing direction being transverse to the stacking direction.

2. The method of claim 1, further comprising inverting the mono frame so that the injection hole faces upward before the step of injecting the thermally conductive resin through the injection hole.

3. The method of claim 1, wherein the spring comprises at least one of a plate spring and a cylindrical spring.

4. A battery module comprising:
a cell stack including one or more battery cells having leads extending therefrom along a first direction, wherein the first direction is coplanar with the one or more battery cells;
a mono frame accommodating the cell stack therein; and
a thermally conductive resin layer positioned between a first exterior surface of the cell stack and a first portion of the mono frame,
wherein the battery module further comprises at least one spring positioned between a second exterior surface of the cell stack and a second portion of the mono frame, the second exterior surface being positioned on an opposite side of the cell stack from the first exterior surface, and wherein the at least one spring is arranged to apply a biasing force to the cell stack along a second direction transverse to the first direction.

5. The battery module of claim 4, wherein the at least one spring is configured to push the cell stack towards the first portion of the mono frame.

6. The battery module of claim 4, further comprising:
a busbar frame received in the mono frame together with the cell stack,
the busbar frame comprises an upper frame positioned along the second exterior surface of the cell stack, and
the at least one spring is positioned between the upper frame and the second portion of the mono frame.

7. The battery module of claim 4, wherein the at least one spring comprises at least one of a plate spring and a cylindrical spring.

8. The battery module of claim 4, wherein the at least one spring comprises two or more springs.

9. The battery module of claim 4, wherein the thermally conductive resin layer comprises a thermally conductive adhesive material.

10. The battery module of claim 4, wherein the mono frame defines a tubular shape in which third and fourth portions are open, the third and fourth portions being positioned on opposing sides of the mono frame from one another with the first and second portions extending therebetween.

11. A battery pack comprising at least one of the battery module according to claim 4.

12. The battery module of claim 4, wherein the one or more battery cells are stacked in a stacking direction, and wherein the at least one spring is arranged to apply the biasing force to the cell stack along a direction transverse to the stacking direction.

* * * * *